(12) United States Patent
Onishi

(10) Patent No.: US 7,078,644 B2
(45) Date of Patent: Jul. 18, 2006

(54) RESISTANCE WELDING METHOD, RESISTANCE WELDING APPARATUS, AND METHOD FOR MANUFACTURING ELECTRONIC COMPONENT

(75) Inventor: Katsuhiro Onishi, Sabae (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/725,132

(22) Filed: Dec. 1, 2003

(65) Prior Publication Data

US 2004/0144758 A1    Jul. 29, 2004

(30) Foreign Application Priority Data

Jan. 27, 2003    (JP)    ............................. 2003-017593

(51) Int. Cl.
    *B23K 20/00*    (2006.01)
(52) U.S. Cl. .................. 219/56.22; 219/56.1; 219/86.9
(58) Field of Classification Search ................ 219/109, 219/86.9, 56.22, 56.21, 56.1
See application file for complete search history.

(56) References Cited

U.S. PATENT DOCUMENTS

| 2,045,523 | A | * | 6/1936 | Fassler | ........................ | 219/86.9 |
| 2,272,968 | A | * | 2/1942 | Dyer | .......................... | 219/86.9 |
| 3,089,020 | A | * | 5/1963 | Hurlebaus | ................. | 219/56.21 |
| 3,462,577 | A | * | 8/1969 | Helms | ........................ | 219/91.1 |
| 5,370,300 | A | * | 12/1994 | Okumura | ................. | 228/180.5 |
| 5,773,780 | A | * | 6/1998 | Eldridge et al. | .......... | 219/56.22 |
| 5,859,400 | A | * | 1/1999 | Inagaki et al. | ............. | 219/56.1 |
| 5,897,049 | A | * | 4/1999 | Nakamura et al. | ........ | 228/180.5 |

FOREIGN PATENT DOCUMENTS

JP    07-291344    11/1995

* cited by examiner

*Primary Examiner*—Len Tran
(74) *Attorney, Agent, or Firm*—Keating & Bennett, LLP

(57) ABSTRACT

In a resistance welding method and a resistance welding apparatus which prevent a decrease in bonding strength between a lead wire and a metal member due to a partially formed current flow path and which immediately removes a defective component from a manufacturing line, a plurality of second welding electrodes in contact with the metal member is provided so as to provide a plurality of current flow paths, and accordingly, to prevent an unevenly distributed current flow. The bonding strength is measured to determine whether it is satisfactory or not on the basis of currents flowing through the second welding electrodes. Also, the electronic component is fixed by the second welding electrodes after resistance welded.

17 Claims, 8 Drawing Sheets

RESISTANCE WELDING METHOD, RESISTANCE WELDING APPARATUS, AND METHOD FOR MANUFACTURING ELECTRONIC COMPONENT

BACKGROUND OF THE INVENTION

1. Field of the Invention

The present invention relates to a resistance welding method, a resistance welding apparatus, and a method for manufacturing an electronic component using the resistance welding method and apparatus, and more particularly, to a resistance welding method of at least one lead wire of the electronic component.

2. Description of the Related Art

Some electronic components, such as a variable resistor, include lead wires disposed therein for being mounted on corresponding printed wiring boards. The lead wire is often bonded to an external electrode by resistance welding. The general structure of a resistance welding apparatus for the foregoing bonding is illustrated in FIG. 7.

The resistance welding apparatus includes a first welding electrode 1 clamping a lead wire 10, a second welding electrode 2, and a welding power source 3. The lead wire 10 is in pressure contact with a plate-like metal member 12 disposed on the upper surface of a main body 11 of the electronic component. With this arrangement, by passing a current through the second welding electrode 2 from the first welding electrode 1 via the lead wire 10 and the metal member 12, heat is generated at a contact portion between the lead wire 10 and the metal member 12, and thus, the generated heat causes the lead wire 10 and the metal member 12 to melt and to be bonded to each other.

Such a resistance welding method is disclosed in Japanese Unexamined Patent Application Publication No. 7-291344.

In the known method, a single second welding electrode 2 is provided. Since a current is likely to pass in a concentrated manner through a portion having a low resistance, a current flow path is close to the second welding electrode 2 as diagrammatically shown in FIG. 8. Hence, only a small portion of an end 10a of the lead wire 10 (a portion encircled by an ellipse 13 in FIG. 8) melts, which results in an insufficient bonding strength.

Also, since a concentrated current flows through a single portion, heat is excessively generated at the portion through which the concentrated current flows, which sometimes causes problems in that the plate-like metal member 12 is perforated and the end 10a of the lead wire 10 penetrates through the metal member 12. When the metal member 12 is perforated or the lead wire 10 penetrates through the metal member 12, an insufficient bonding strength is obtained.

In addition, since no device for measuring a bonding strength immediately after welding has been available, a defective product is sometimes forwarded to downstream steps. In order to prevent this problem, an additional inspection step is required, which increases the manufacturing costs.

SUMMARY OF THE INVENTION

To overcome the problems described above, preferred embodiments of the present invention provide a resistance welding method and a resistance welding apparatus which prevent unevenly distributed current flow and which achieves sufficient bonding strength, and a method for manufacturing an electronic component using the resistance welding method or the resistance welding apparatus. In addition, the resistance welding apparatus immediately removes a defective product from a manufacturing line by performing a bonding strength inspection immediately after welding.

A resistance welding method for bonding a lead wire and a metal member to each other by resistance welding according to a preferred embodiment of the present invention includes the steps of pressing the lead wire clamped by a first welding electrode so as to come into contact with the metal member, and passing currents through second welding electrodes in contact with the metal member from the first welding electrode via the lead wire and the metal member. A plurality of the second welding electrodes is preferably used.

Use of the plurality of second welding electrodes provides a plurality of current flow paths such that a concentrated current flow is prevented, and a bonding area between the lead wire and the metal member is increased such that a bonding strength therebetween is greatly improved. Also, the use of the plurality of second welding electrodes prevents the metal member from being perforated by the concentrated current flow and prevents the lead wire from penetrating through the metal member.

The resistance welding method according to preferred embodiments of the present invention preferably further includes the steps of measuring a current flowing through each of the plurality of second welding electrodes, and determining whether a bonding strength is satisfactory or not based on the measured currents.

When currents flow evenly through the plurality of respective second welding electrodes, the highest bonding strength is obtained. Whereas, when currents flow unevenly, a sufficient bonding strength may not be obtained. With the above-described method, by measuring a current flowing through each of the plurality of second welding electrodes and comparing the measured currents, the method effectively determines whether a sufficient bonding strength is obtained or not.

Also, a resistance welding apparatus according to another preferred embodiment of the present invention includes a welding power source, a first welding electrode clamping a lead wire, and a plurality of second welding electrodes. The first welding electrode and the second welding electrodes connected to the welding power source, and by passing currents through the second welding electrodes from the first welding electrode via the lead wire and a metal member, the lead wire and the metal member are bonded to each other by resistance welding.

By providing the plurality of second welding electrodes, a concentrated current flow is prevented, thereby achieving a sufficient bonding strength.

In addition, the resistance welding apparatus according to a preferred embodiment of the present invention preferably further includes a device for measuring a current flowing through each of the plurality of second welding electrodes.

By measuring a current flowing through each of the plurality of second welding electrodes and comparing the measured currents, the apparatus determines whether a sufficient bonding strength is obtained or not.

Furthermore, the resistance welding apparatus according to a preferred embodiment of the present invention preferably further include an inspection lead-wire chuck for checking a bonding strength between the lead wire and the metal member by clamping and pulling the lead wire.

By providing the inspection lead-wire chuck, the bonding strength is checked immediately after resistance welding, thereby preventing a defective product having an insufficient bonding strength from being forwarded to downstream steps.

Also, according to preferred embodiments of the present invention, since the bonding strength is double checked on the basis of the currents flowing through the corresponding second welding electrodes and by the inspection lead-wire chuck so as to immediately remove a product which is determined to be defective, even when defective welding occurs, the defective product is prevented from being forwarded to the down stream steps and from being subjected to down stream processes, thereby greatly reducing manufacturing costs.

Moreover, a method for manufacturing an electronic component according to preferred embodiments of the present invention includes the step of bonding a lead wire to a metal member disposed in the main body of the electronic component by resistance welding. The lead wire is bonded to the metal member by the foregoing resistance welding method or the foregoing resistance welding apparatus.

With this method, defects of a poor bonding strength between the metal member and the lead wire are eliminated and minimized, which thereby greatly improves yields of the electronic components.

Other features, elements, steps, characteristics and advantages of the present invention will become more apparent from the following detailed description of the present invention will become more apparent from the following detailed description of same with reference to the attached drawings.

DETAILED DESCRIPTION OF PREFERRED EMBODIMENTS

Figure 1A:
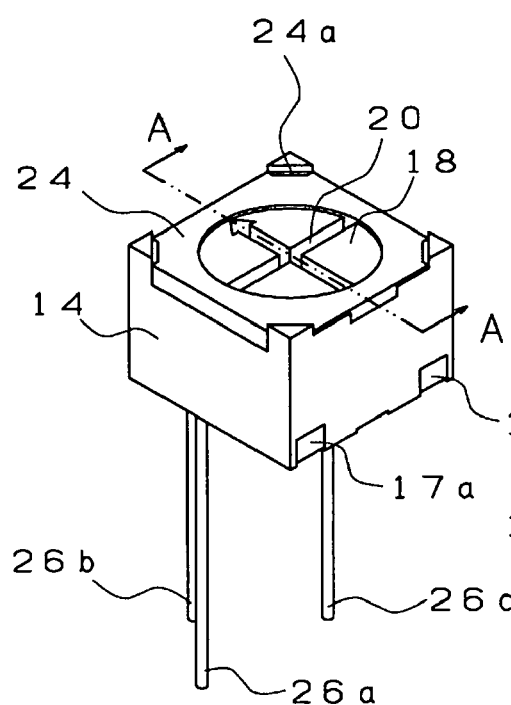
FIGS. 1A and 1B are perspective views of a variable resistor as an example of an electronic component according to a preferred embodiment of the present invention.
Figure 1B:
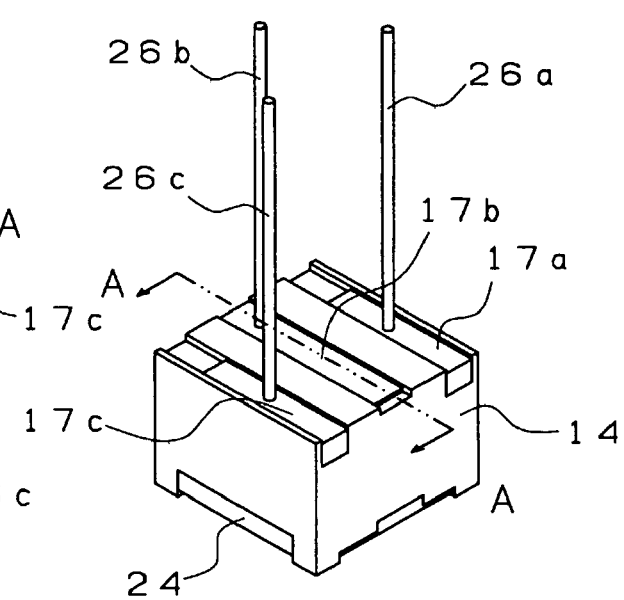

The structure of a variable resistor as an example of an electronic component used as a workpiece in preferred embodiments of the present invention will be described with reference to FIGS. 1 and 2. FIGS. 1A and 1B are perspective views of the variable resistor. Also, FIG. 2 is a sectional view of the variable resistor taken along the line A—A indicated in FIG. 1.

Figure 2:
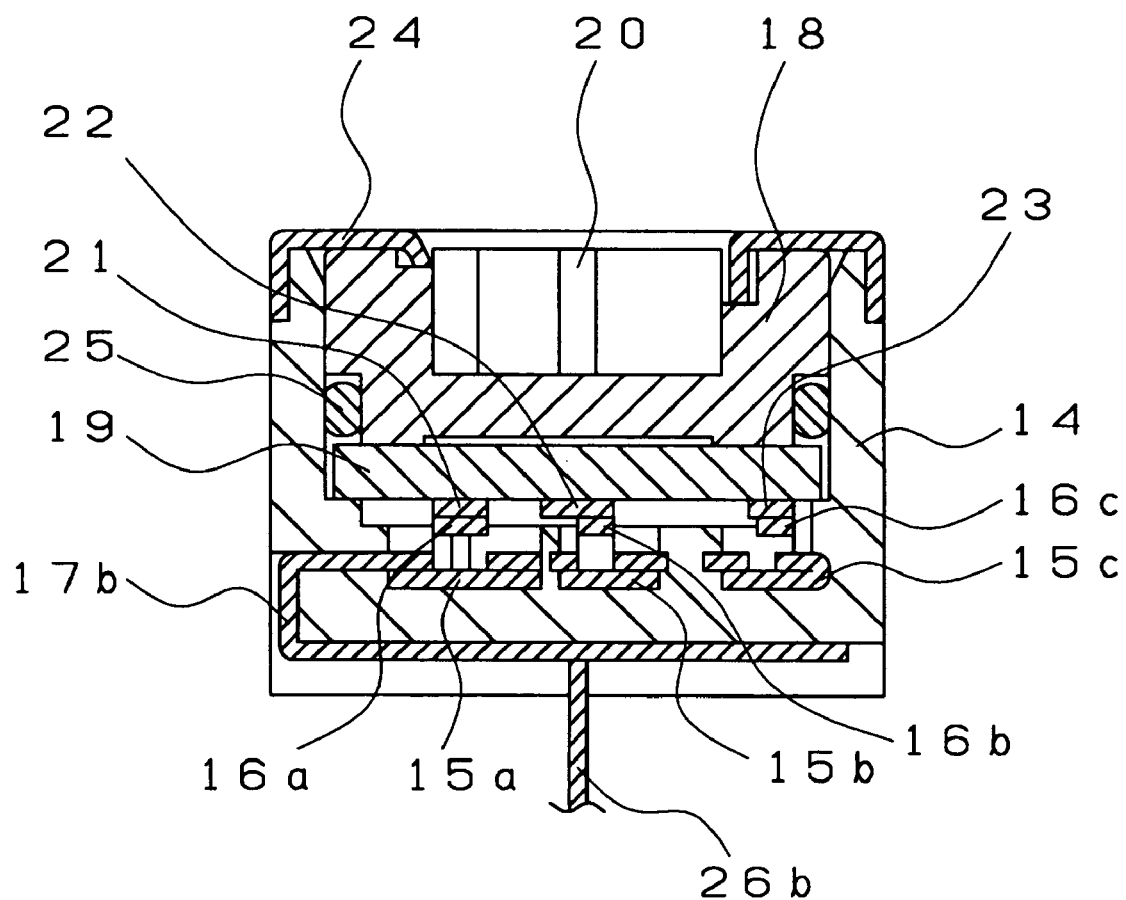
FIG. 2 is a sectional view of the variable resistor shown in FIG. 1.

As shown in FIG. 2, the variable resistor includes a casing 14, sliding contactors 15a, 15b, and 15c, a rotor, a metal cover 24, and lead terminals 26a, 26b, and 26c (where, the lead terminals 26a and 26c are shown in FIG. 1 not in FIG. 2).

The casing 14 made of a heat-resistant resin or other suitable material includes a depression, and the sliding contactors 15a, 15b, and 15c are fixed to the bottom of the depression. The sliding contactors 15a, 15b, and 15c are bent upwardly and respective ends thereof define arms 16a, 16b, and 16c. Also, the sliding contactors 15a, 15b, and 15c are connected to external electrodes 17b, 17a, and 17c, respectively. In addition, the rotor is disposed in the depression of the casing 14.

The rotor has an approximately cylindrical shape and includes a main body 18 and a base plate 19. The main body 18 of the rotor is preferably made of ceramic, resin, or other suitable material and includes a screwdriver cross groove 20 provided on the upper surface thereof. One of the principal surfaces of the base plate 19 is bonded to the main body 18 of the rotor, and the other principal surface opposite to the side that is bonded to the main body 18 of the rotor includes a horseshoe-shaped resistor 21, an inner electrode 22, and an outer electrode 23 disposed thereon. The resistor 21 is connected to the inner electrode 22 at one end thereof and to the outer electrode 23 at the other end thereof. The resistor 21, the inner electrode 22, and the outer electrode 23 are in contact with the arms 16a, 16b, and 16c, respectively.

The metal cover 24 supports the rotor so as to be rotatable with respect to the casing 14, and is fixed to the casing 14 via claws 24a. Also, a hermetically sealing O-ring 25 is inserted between the main body 18 of the rotor and the casing 14, and is made of silicone rubber or other suitable material.

As shown in FIG. 1, the lead terminals 26a, 26b, and 26c, each having an approximately round cross-section, are respectively bonded to the external electrodes 17a, 17b, and 17c by resistance welding. To mount the variable resistor on a printed wiring board, the lead terminals 26a, 26b, and 26c are inserted into the printed wiring board with an automatic inserter and then are cut and bent so as to temporarily fix the variable resistor, and subsequently, the variable resistor is fixed to the printed wiring board via soldering.

The variable resistor is configured such that, by inserting a screw driver into the screwdriver cross groove 20 and turning the rotor, the arms 16a, 16b, and 16c slide respectively on a resistor 21, the inner electrode 22, and the outer electrode 23 such that their mutual positions vary, thereby enabling resistances between the lead terminal 26a and the lead terminal 26b and between the lead terminal 26b and the lead terminal 26c to be adjusted.

To manufacture such a variable resistor, the sliding contactors 15a, 15b, and 15c, the rotor, and other components are provided in the casing 14, and lead wires are bonded to the external electrodes 17a, 17b, and 17c by resistance welding so as to define the lead terminals 26a, 26b, and 26c. Alternatively, the variable resistor may be manufactured such that the sliding contactors 15a, 15b, and 15c and the external electrodes 17a, 17b, and 17c are provided in the casing 14, the lead wires are bonded to the corresponding external electrodes so as to define the corresponding lead terminals, and then the rotor and the metal cover 24 are provided in the casing 14.

Referring now to FIGS. 3 to 6A, a method for bonding the lead wires to the external electrodes 17a, 17b, and 17c by resistance welding will be described in detail.

FIGS. 3 to 6D are conceptual views of a resistance welding apparatus according to a preferred embodiment of the present invention. The resistance welding apparatus according to the present preferred embodiment of the present invention preferably includes a first welding electrode 1, second welding electrodes 2a and 2b, a welding power source 3, an inspection lead-wire chuck 4, current sensors 5a and 5b, and a determination unit 6.

The first welding electrode 1 for clamping a lead wire 10 is movable in the vertical direction and in connection with the positive electrode of the welding power source 3.

The two second welding electrodes 2a and 2b are arranged so as to be movable in the corresponding directions indicated in the figure. Also, springs 7a and 7b bias the second welding electrodes 2a and 2b upward. That is, since the contact surfaces of the second welding electrodes 2a and 2b with a metal member, which will be described later, is on the other sides of the points on the second electrodes 2a and 2b on which forces of the springs 7a and 7b are applied, having fulcrums 8a and 8b interposed therebetween, the contact surfaces are subjected to downward forces by the corresponding springs 7a and 7b. By adjusting spring forces of the springs 7a and 7b, contact pressures of the second welding electrodes 2a and 2b applied on the metal member are independently adjusted. Also, the second welding electrodes 2a and 2b are connected to the negative electrode of the welding power source 3.

Meanwhile, although the welding power source 3 has been described as a direct-current power source, it is not limited to the direct-current power source and may be an alternating current power source.

The inspection lead-wire chuck 4 for clamping the lead wire 10 provides an upward pulling force caused by a spring 7c disposed between itself and a supporting member 9. Although the inspection lead-wire chuck 4 is disposed above the first welding electrode 1 in the figure, it may be disposed below the first welding electrode 1.

The current sensors 5a and 5b measure currents flowing through the two second welding electrodes 2a and 2b, respectively. The determination unit 6 compares the currents flowing through the two second welding electrodes 2a and 2b and measured by the current sensors 5a and 5b, respectively.

Figure 4A:
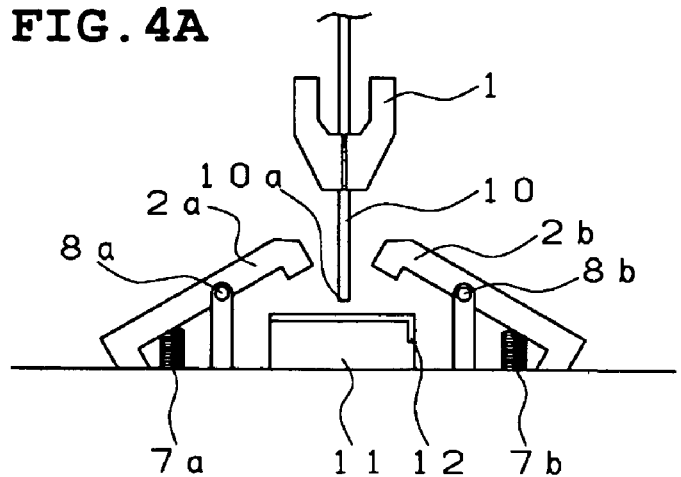
FIGS. 4A–4C illustrates a process of the steps of a resistance welding method according to another preferred embodiment of the present invention.
Figure 4B:
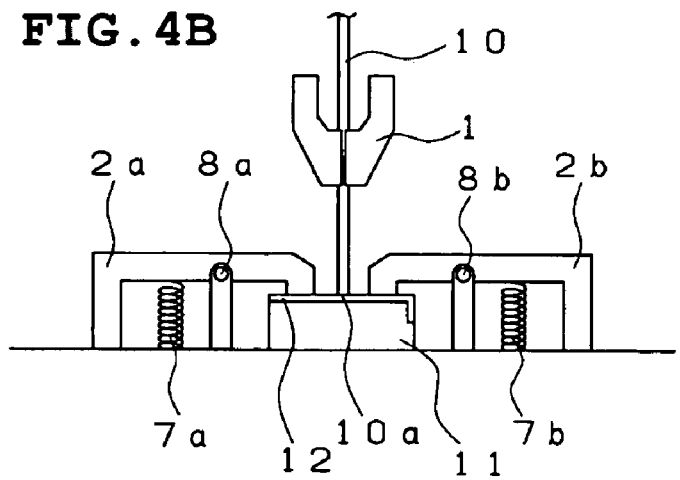
Figure 4C:
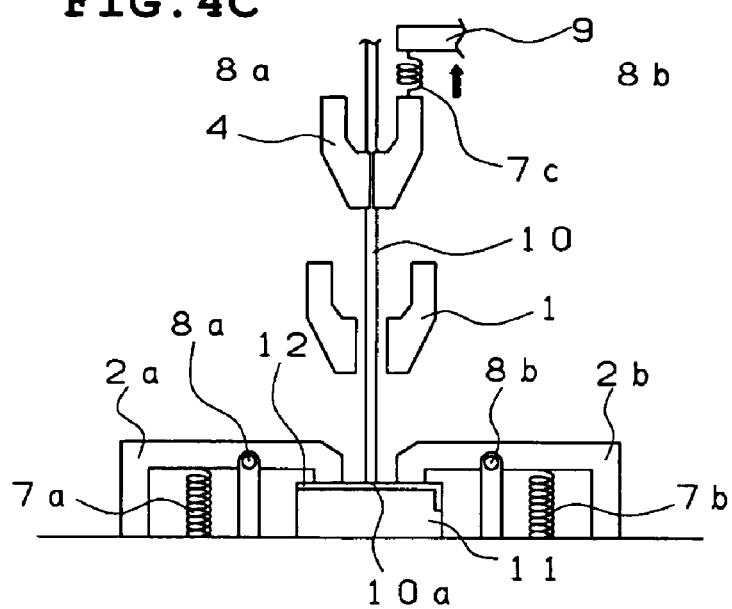

FIGS. 4A–4C illustrates a process of welding a lead wire to one of the external electrodes of the variable resistor. In FIGS. 4A–4C, a main body 11 of the electronic component is defined as the rotor, the metal cover 24, the sliding contactors 15a, 15b, and 15c, and other components mounted to the casing 14, and a metal member 12 is defined as any one of the external electrodes 17a, 17b, and 17c.

As shown in FIG. 4A, the main body 11 of the electronic component is disposed immediately beneath the lead wire 10 such that the plate-like metal member 12 is disposed adjacent to an end 10a of the lead wire 10. In this state, as shown in the figure, the second welding electrodes 2a and 2b maintained in an upwardly elevated state via cams or other suitable elements (not shown).

Then, as shown in FIG. 4B, the second welding electrodes 2a and 2b are adjusted so as to come into contact with the metal member 12. Contact pressures of the second welding electrodes 2a and 2b with the metal member 12 are adjusted by changing upward forces of the springs 7a and 7b applied on the second welding electrodes 2a and 2b, respectively. Also, the second welding electrodes 2a and 2b are independently pushed up by the springs 7a and 7b, whereby the contact pressures are independently adjusted.

At the same time, the end 10a of the lead wire 10 is moved into contact with the metal member 12. In this state, a clamping pressure of the first welding electrode 1 exerted on the lead wire 10, a contact pressure between the end 10a of the lead wire 10 and the metal member 12, and the two contact pressures between the metal member 12 and the second welding electrodes 2a and 2b are adjusted such that a contact resistance between the end 10a of the lead wire 10 and the metal member 12 is much greater than any one of a contact resistance between the first welding electrode 1 and the lead wire 10, a resistance of a part of the lead wire 10 extending from the first welding electrode 1 to the end 10a of the lead wire 10, a resistance of a part of the metal member 12 extending from the contact portion thereof with the end 10a of the lead wire 10 to each of the second welding electrodes 2a and 2b, and a contact resistance between the metal member 12 and each of the second welding electrodes 2a and 2b. The reason for this adjustment is such that resistance welding causes heat to be generated in a concentrated manner at a portion having the highest resistance along current flow paths.

When the welding power source 3 feeds a current so as to flow through the second welding electrodes 2a and 2b from the first welding electrode 1 via the lead wire 10, and the metal member 12, heat is generated at a contact portion between the end 10a of the lead wire 10 and the metal member 12 such that the end 10a of the lead wire 10 and the metal member 12 are bonded to each other by resistance welding.

Figure 5:
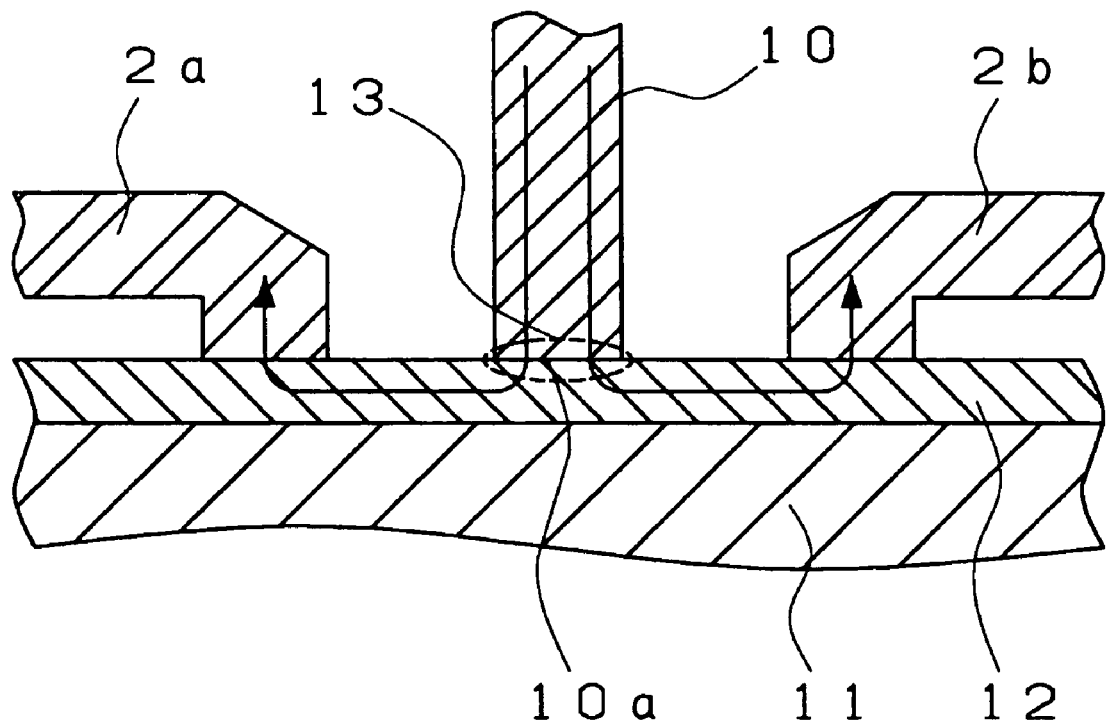
FIG. 5 is a diagrammatic illustration of current flow paths according to preferred embodiments of the present invention.
Figure 6A:
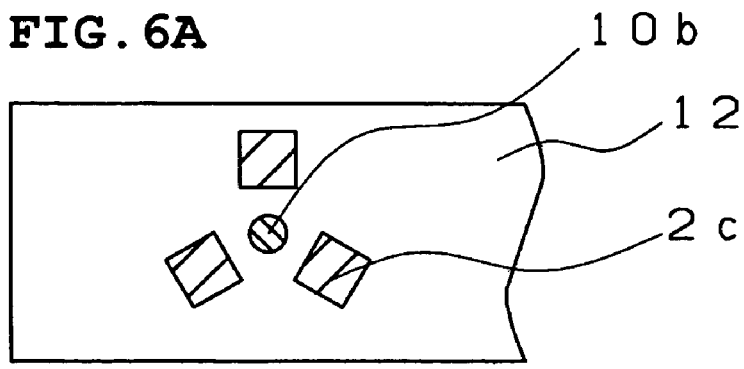
FIGS. 6A–6D are plan views illustrating modifications of an arrangement of second welding electrodes according to preferred embodiments of the present invention.
Figure 6B:
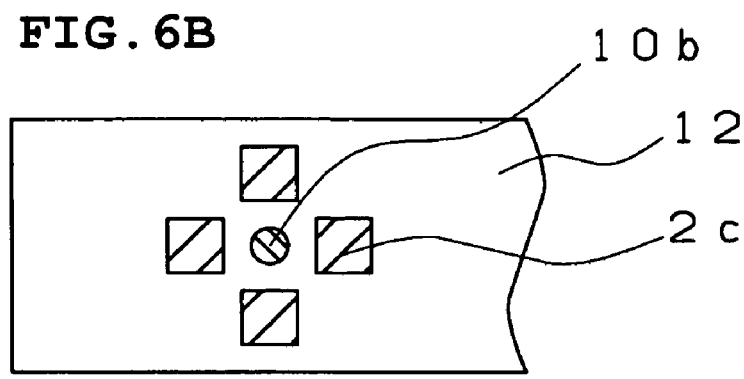
Figure 6C:
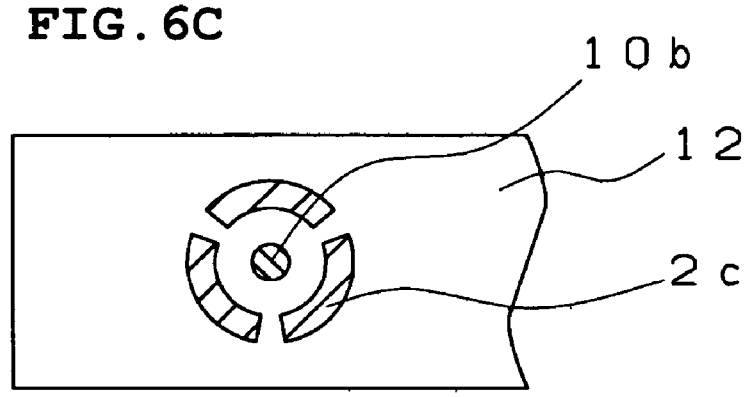
Figure 6D:
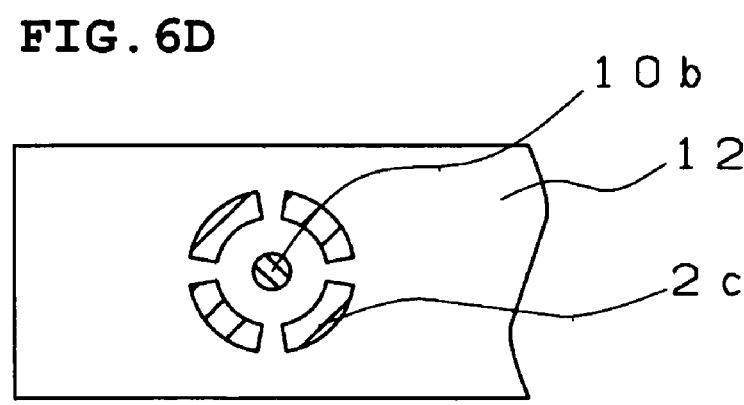

FIG. 5 is a sectional view diagrammatically illustrating the current flow paths. Since the two second welding electrodes 2a and 2b are provided in the present preferred embodiment, a concentrated current does not flow through a single portion as in the known art. Hence, heat is relatively evenly generated in the contact surface between the end 10a of the lead wire 10 and the metal member 12, and thus, these metals are melt and welded to each other over an increased area (an area shown by an ellipse 13 in FIG. 5), thereby greatly improving the bonding strength therebetween. Also, since this arrangement prevents heat from being excessively generated at any specific portion, there is no risk of the metal member 12 being perforated or the lead wire 10 penetrating the metal member 12.

Figure 3:
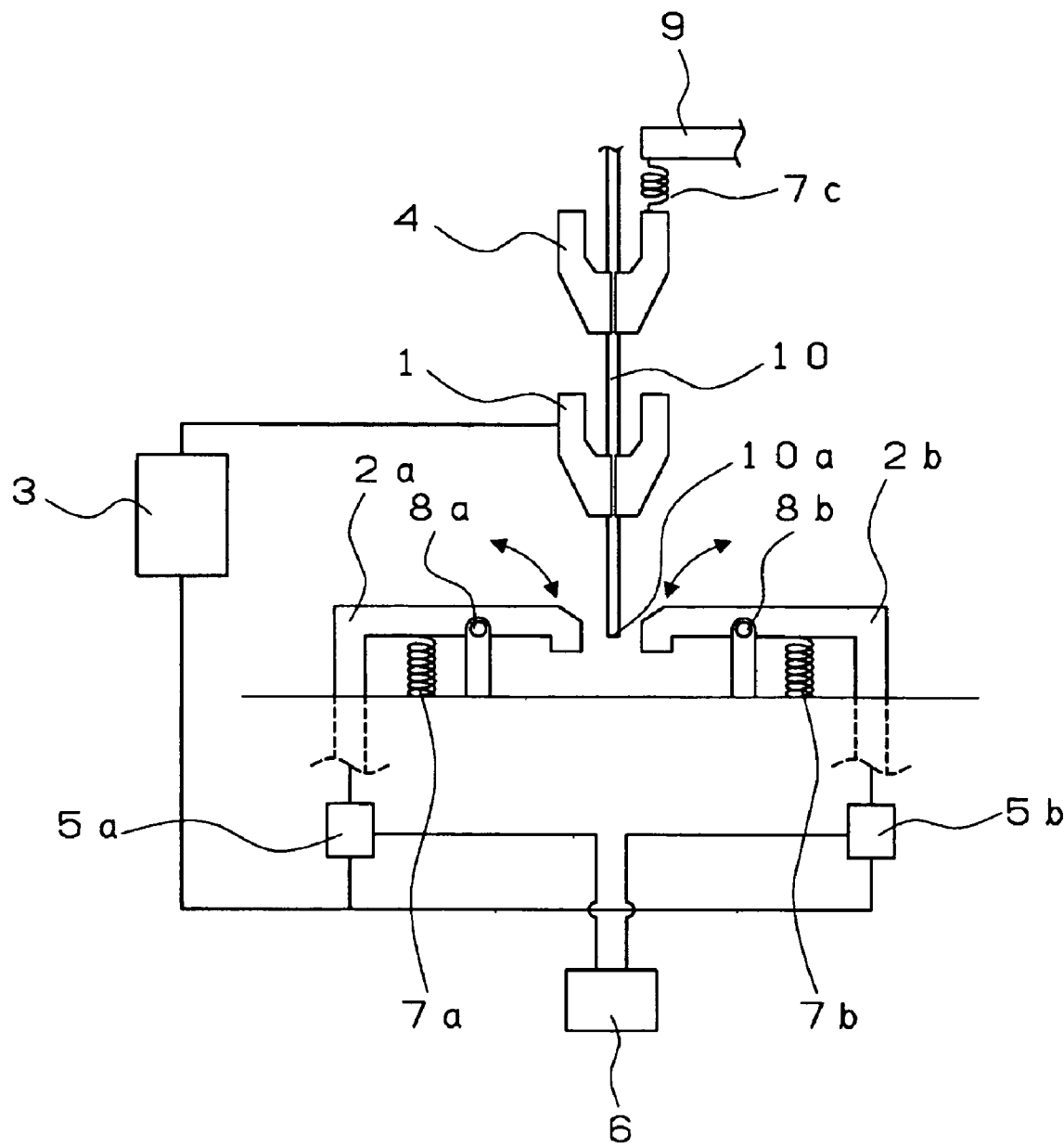
FIG. 3 is a schematic view of a resistance welding apparatus according to another preferred embodiment of the present invention.

Currents flowing through the second welding electrodes 2a and 2b are respectively measured by the current sensors 5a and 5b shown in FIGS. 3 and 6 and are compared by the determination unit 6. Then, the determination unit 6 computes, for example, a difference between the currents flowing through the two second welding electrodes 2a and 2b and, when the difference exceeds a predetermined limit, determines that a poor weld has occurred, and thus, the poorly welded main body 11 of the electronic component is removed from the manufacturing line.

The above-described determination is based on the idea that a large current must be prevented from flowing primarily through one of the second welding electrodes 2a and 2b in order to fully achieve the advantages of preferred embodiments of the present invention in which, by providing a plurality of current flow paths, a concentrated current flow is prevented.

Subsequently, the main body 11 of electronic components which have not been determined to be "defective" in the above-mentioned step is subjected to a bonding strength inspection, which will be described below. As shown in FIG. 4C, when the clamping of the first welding electrode 1 is released, the lead wire 10 is pulled upward by the inspection lead-wire chuck 4 on which an upward pulling force was previously applied by the spring 7c. In this state, since the main body 11 of the electronic component and the metal member 12 are fixed by the two second welding electrodes 2a and 2b, a force is applied on a bonding portion between the metal member 12 and the end 10a of the lead wire 10 in a direction so as to pull them away from each other. With this arrangement, the bonding strength between the lead wire 10 and the metal member 12 is measured. When a poorly bonded component is detected, that is, when the lead wire 10 and the metal member 12 are detached from each other with a force applied by the spring 7c, the component is immediately removed from the manufacturing line.

Figure 7:
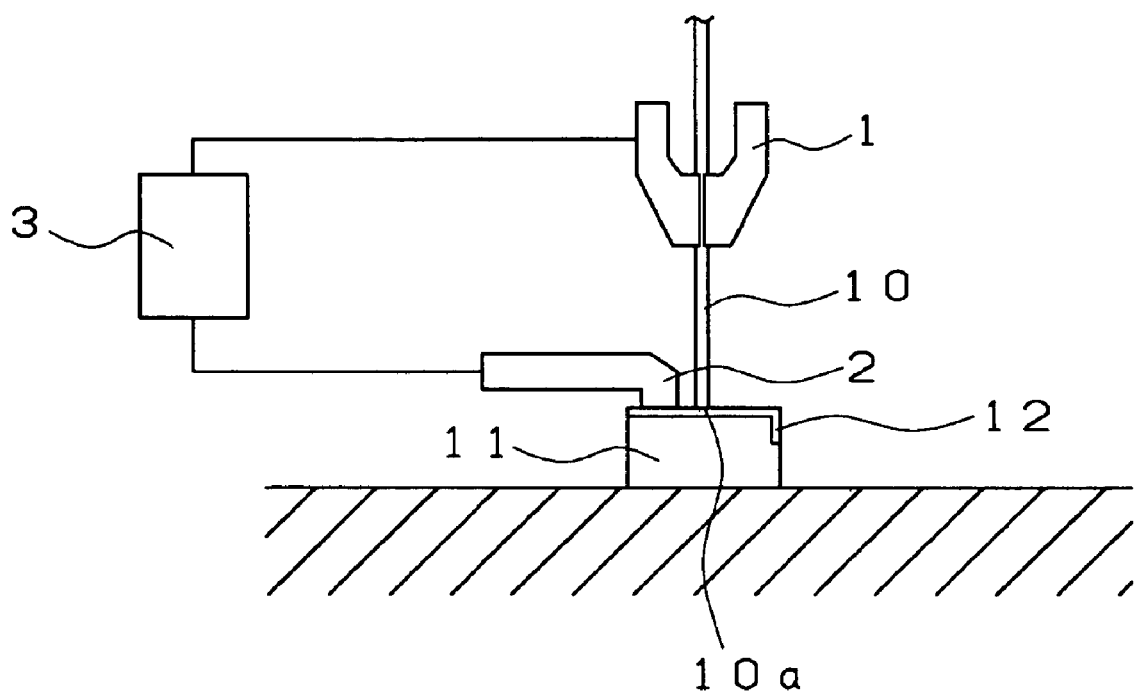
FIG. 7 is a schematic view of a known resistance welding apparatus.
Figure 8:
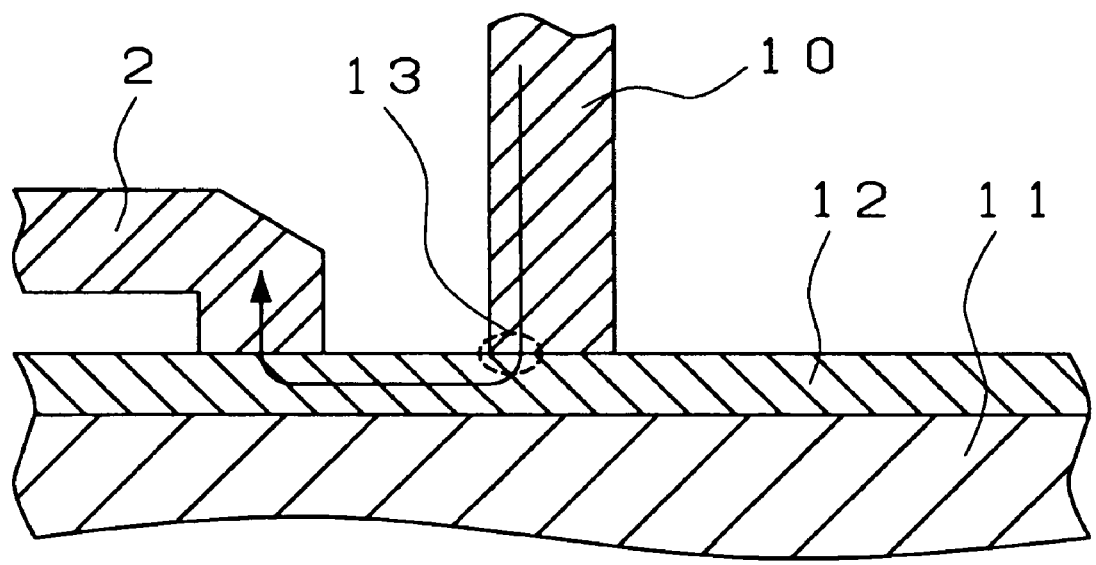
FIG. 8 is a diagrammatic illustration of a current flow path in accordance with a known resistance welding method.

In the meantime, since a known resistance welding apparatus shown in FIG. 7 includes only a single second welding electrode 2, and thus, the main body 11 of the electronic component is not fixed, pulling the lead wire 10 upwards causes the main body 11 of the electronic component to be elevated upwards, whereby bonding strength inspection cannot be performed.

After the bonding strength inspection with the inspection lead-wire chuck 4 is completed, the inspected component is sent to downstream steps and is subjected to necessary processes of the downstream steps so as to complete a variable resistor.

As a modification of the resistance welding apparatus according to preferred embodiments of the present invention, the second welding electrodes are not limited to two units and may include three units or more. In the latter case, the second welding electrodes are preferably disposed so as to encircle the lead wire so as to ensure the current to be distributed is as even as possible. FIGS. 6A to 6D illustrate examples of positional relationships between a contact position 10b of the lead wire and contact positions 2c of the second welding electrodes with respect to the metal member 12. In all cases, the contact positions 2c of the second welding electrodes are preferably arranged so as to encircle the contact position 10b of the lead wire.

The configurations of the first welding electrode 1, the second welding electrodes 2a and 2b, and the inspection lead-wire chuck 4 according to the foregoing preferred embodiment are not limited to those in the foregoing description and may be altered as long as they have the same functions as in the foregoing description.

Also, those skilled in the art will appreciate that the method for manufacturing an electronic component according to the present invention is not limited to a method for manufacturing a variable resistor and is applicable to any electronic component having at least one lead terminal.

The present invention is not limited to each of the above-described preferred embodiments, and various modifications are possible within the range described in the claims. An embodiment obtained by appropriately combining technical features disclosed in each of the different preferred embodiments is included in the technical scope of the present invention.

What is claimed is:

1. A resistance welding method for bonding a lead wire and a metal member to each other by resistance welding, comprising the steps of:
    pressing the lead wire which is clamped by a first welding electrode so as to be in contact with the metal member;
    providing a plurality of second welding electrodes; and
    passing currents through the plurality of second welding electrodes in contact with the metal member from the first welding electrode via the lead wire and the metal member; wherein
    in the step of passing currents through the plurality of second welding electrodes, each of the plurality of second welding electrodes are biased upward and into contact with the metal member by springs.

2. The resistance welding method according to claim 1, further comprising the steps of:
    measuring a current flowing through each of the plurality of second welding electrodes; and
    determining whether a bonding strength is satisfactory or not on the basis of the measured currents.

3. The resistance welding method according to claim 1, wherein the current passed through the plurality of second welding electrodes is provided via a direct-current power source.

4. A resistance welding apparatus, comprising:
    a welding power source;
    a first welding electrode for clamping a lead wire; and
    a plurality of second welding electrodes; wherein
    the first welding electrode and the second welding electrodes are connected to the welding power source, and by passing currents through the second welding electrodes from the first welding electrode via the lead wire and a metal member, the lead wire and the metal member are bonded to each other via resistance welding; and
    the resistance welding apparatus further comprises an inspection lead-wire chuck for checking a bonding strength between the lead wire and the metal member by clamping and pulling the lead wire.

5. The resistance welding apparatus according to claim 4, further comprising a device for measuring a current flowing through each of the plurality of second welding electrodes.

6. The resistance welding apparatus according to claim 4, further comprising springs for biasing the plurality of second welding electrodes upward.

7. The resistance welding apparatus according to claim 4, wherein the welding power source is a direct-current power source.

8. The resistance welding apparatus according to claim 5, wherein said device for measuring a current flowing through each of the plurality of second welding electrodes includes current sensors.

9. The resistance welding apparatus according to claim 5, further comprising a determination unit for computing a difference between the currents flowing through each of the plurality of second welding electrodes.

10. A method for manufacturing an electronic component, comprising the step of bonding a lead wire to a metal member disposed in a main body of the electronic component by resistance welding; wherein
    the lead wire is bonded to the metal member using the resistance welding method set forth in claim 1.

11. A method for manufacturing an electronic component, comprising the step of bonding a lead wire to a metal member disposed in a main body of the electronic component by resistance welding; wherein
    the lead wire is bonded to the metal member using the resistance welding apparatus set forth in claim 5.

12. A resistance welding apparatus, comprising:
    a welding power source;
    a first welding electrode for clamping a lead wire;
    a plurality of second welding electrodes; and
    springs for biasing the plurality of second welding electrodes upward; wherein
    the first welding electrode and the second welding electrodes are connected to the welding power source, and by passing currents through the second welding electrodes from the first welding electrode via the lead wire and a metal member, the lead wire and the metal member are bonded to each other via resistance welding.

13. The resistance welding apparatus according to claim 12, further comprising a device for measuring a current flowing through each of the plurality of second welding electrodes.

14. The resistance welding apparatus according to claim 12, wherein the welding power source is a direct-current power source.

15. The resistance welding apparatus according to claim 13, wherein said device for measuring a current flowing through each of the plurality of second welding electrodes includes current sensors.

16. The resistance welding apparatus according to claim 13, further comprising a determination unit for computing a difference between the currents flowing through each of the plurality of second welding electrodes.

17. A method for manufacturing an electronic component, comprising the step of bonding a lead wire to a metal member disposed in a main body of the electronic component by resistance welding; wherein the lead wire is bonded to the metal member using the resistance welding method set forth in claim 12.

* * * * *